United States Patent [19]
Tabata

[11] Patent Number: 5,875,172
[45] Date of Patent: Feb. 23, 1999

[54] AUTOMATIC TRANSMISSION NETWORK RESTORING SYSTEM

[75] Inventor: Osamu Tabata, Tokyo, Japan

[73] Assignee: NEC Corporation, Tokyo, Japan

[21] Appl. No.: 656,096

[22] Filed: May 31, 1996

[30] Foreign Application Priority Data

May 31, 1995 [JP] Japan .................................. 7-132486
Sep. 20, 1995 [JP] Japan .................................. 7-240383

[51] Int. Cl.⁶ .................................................. H04J 3/14
[52] U.S. Cl. ................................................... 370/228
[58] Field of Search .............................. 370/216, 217,
370/218, 219, 220, 221, 222, 223, 224,
225, 226, 227, 228, 241, 242, 244, 246,
247, 248, 250, 252, 256, 357, 358, 360,
375, 376, 381, 535, 528, 522, 536, 537,
542; 340/825.01, 825.03, 826, 827, 825.16;
395/181, 181.01, 181.02, 185.01

[56] References Cited

U.S. PATENT DOCUMENTS

| | | | |
|---|---|---|---|
| 5,319,632 | 6/1994 | Iwasaki | 370/228 |
| 5,412,652 | 5/1995 | Lu | 370/223 |
| 5,435,003 | 7/1995 | Chng et al. | 370/228 |
| 5,491,696 | 2/1996 | Nishimura | 370/222 |
| 5,537,393 | 7/1996 | Shioda et al. | 370/228 |
| 5,537,532 | 7/1996 | Chng et al. | 395/182.02 |

FOREIGN PATENT DOCUMENTS

60-22848  2/1985  Japan .
64-23647  1/1989  Japan .

*Primary Examiner*—Huy D. Vu
*Attorney, Agent, or Firm*—Scully, Scott, Murphy & Presser

[57] ABSTRACT

When a system is designed, a spare path corresponding to a working path set between ADMs is preliminarily determined, and spare path terminating point data is held together with working path terminating point data in a path terminating point control data memory 381. Line checking parts 41a and 41b, when detecting generation of A transmission line trouble in the working path, retrieve spare path terminating point data with reference to path terminating point control data 381 in a path terminating point controller 38, and send out the spare path terminating point data together with working path terminating point data to the path switching part 372. The path switching part 372 instructs an STS path switch 42 to switch the working path terminating point from the prevailing path terminating point over to the spare path terminating point, thus realizing bypassing of the working path via the spare path. After restoration of the trouble path, path switching to the initial state is made.

7 Claims, 13 Drawing Sheets

| INSTANCE IDENTIFIER | OPPOSITE SIDE INSTANCE IDENTIFIER |
|---|---|
| $ID_0$ | $ID_1$ |
| $ID_1$ | $ID_n$ |
| ⋮ | ⋮ |

FIG. 11

| ATTRIBUTION | CONTENT | EXAMPLE |
|---|---|---|
| INSTANCE IDENTIFIER | IDENTIFY NUMBER FOR SPECIFYING PATH TERMINATING POINT | $ID_0$ |
| OTHER ATTRIBUTION | | |
| SWITCHING DESTINATION PATH TERMINATING IDENTIFIER | PATH TERMINATING IDENTIFIER /「0」 | $ID_j$ |
| PATH SWITCHING STATE | NON-SWITCH「0」/SWITCH「1」 | 0 |

AUTOMATIC TRANSMISSION NETWORK RESTORING SYSTEM

BACKGROUND OF THE PRESENT INVENTION

The present invention relates to an automatic transmission network restoring system and, more particularly, to a system for automatically restoring a transmission line in trouble in a communication network comprising a synchronous optical transmission network, a plurality of nodes having a function of controlling the switching of a plurality of path terminating points for a synchronous transmission signal path add/drop function, and a network controller for controlling the whole communication network with the synchronous optical transmission network and nodes.

Figure 14:
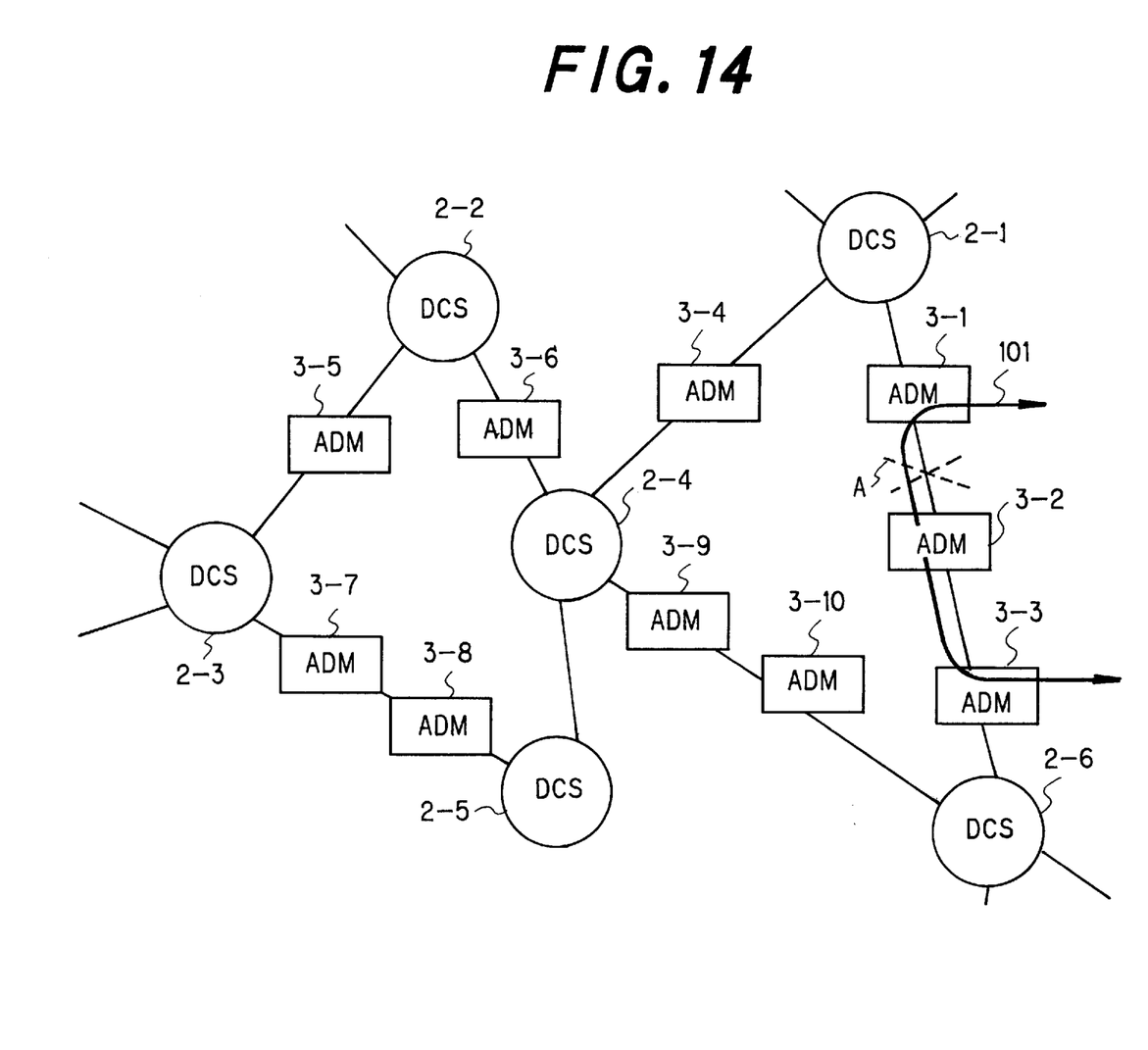
FIG. 14 is a schematic system structure of the synchronous optical transmission network called SONET.
Figure 15:
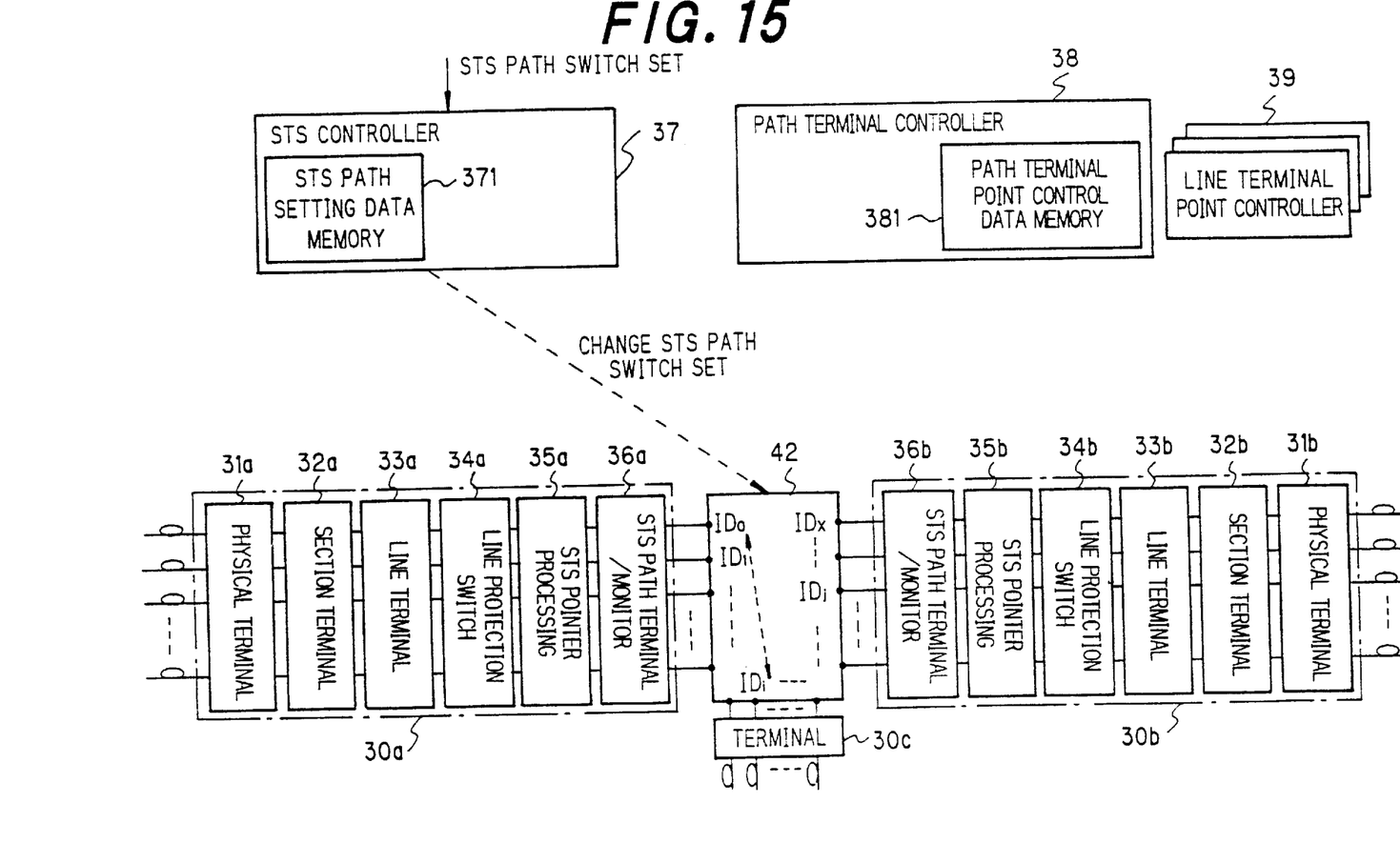
FIG. 15 shows a specific example of node structure.

This type of synchronous optical transmission network is called SONET (Synchronous Optical Network), and FIG. 14 shows the schematic system structure of the system. Referring to FIG. 14, the system comprises DCSs (Digital Cross-connect Systems) 2-1 to 2-6 and ADMs (Add-Drop Multiplexers) 3-1 to 3-10 provided on transmission lines connecting adjacent ones of the DCSs 2-1 to 2-6. The ADMs 3-1 to 3-10 are nodes basically having the add-drop function with respect to the signal path called STS (Synchronous Transport Signal) path. FIG. 15 shows a specific example of node structure.

Figure 2:
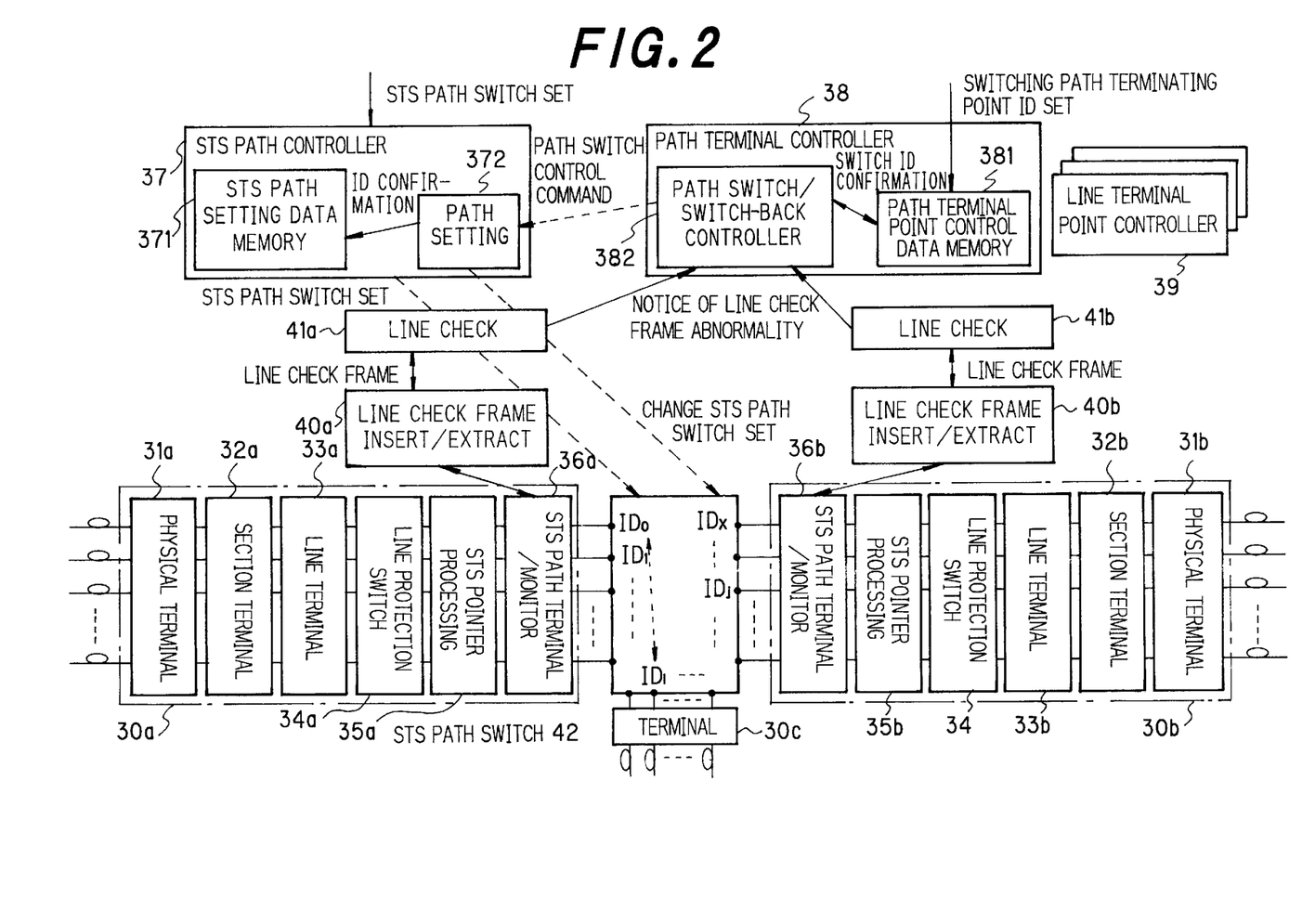
FIG. 2 is a block diagram showing a specific example of each of the ADMs 3-1 to 3-10 as nodes in FIG. 1.

The node structure as illustrated comprises terminals 30a to 30c, as shown in FIG. 2. The terminals 30a to 30c have the same structure, and only the terminals 30a and 30b are shown in detail for the sake of brevity. Physical terminal parts 31a and 31b convert the optical signal inputted to the ADM 3 into the electric signal and also convert the internally generated electric signal into the optical signal to be transmitted to the outside.

Section terminal parts 32a and 32b insert and extract a section over-head into and out of the transmission signal. Line terminal parts 33a and 33b insert and extract line over-head into and out of transmission signal. Line protection switching parts 34a and 34b select normal one of prevailing system/spare system optical fibers having a redundant system switching structure by using K1 and K2 bytes as APS bytes of APS (Automatic Protection Switching) protocol processing transferred between opposite ADMs. STS pointer processing parts 35a and 35b take out the STS payload envelope with H1 and H2 bytes in the line over-head and add an appropriate over-head containing H1 and H2 in the STS payload.

STS path terminal/monitor parts 36a and 36b take out and insert the path over-head from and into the STS payload envelope. An STS path switch 42 is a matrix switch having pluralities of STS payload capacity input and output terminals, and it can connect and disconnect the input and output terminals of the terminals 30a to 30c. The STS path switch 42 has a plurality of path terminal points IDo to IDn, which are switching controlled for inputting and outputting the data to and out of them. For the switching control of the terminal points IDo to IDn, an identifier ID specifying each of these terminal points is preliminarily provided to each thereof, and each terminal is hereinafter represented by the identifier ID.

An STS path control part 37 receives the STS path switch setting control command from a network controller 1 (see FIG. 1) for controlling the entire communication network for controlling the STS path switch 42, as well as updating data in an STS path setting data memory 371 for reflecting the prevailing (i.e., newest) connection status of the STS path switch 42.

Figure 1:
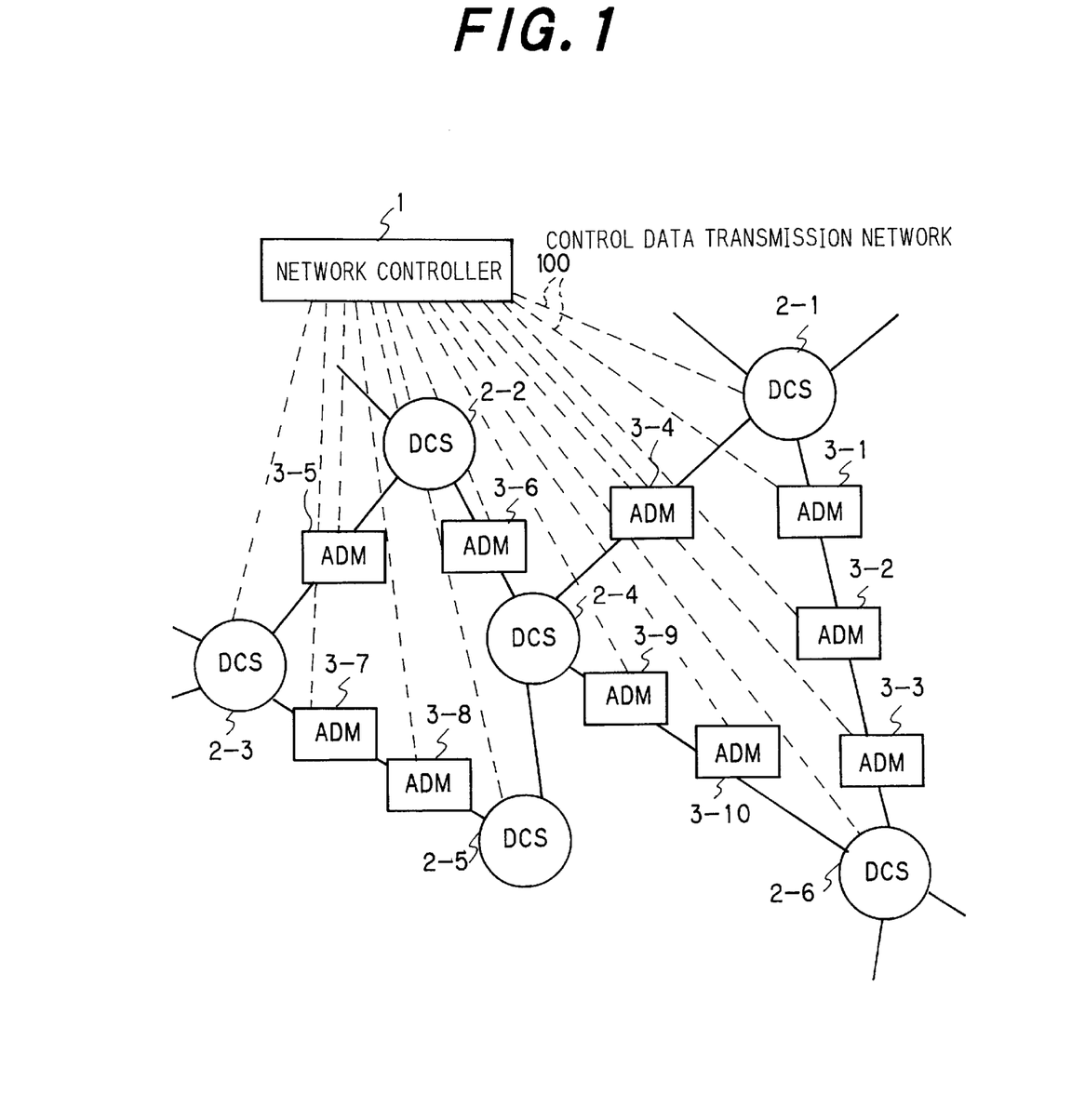
FIG. 1 is a block diagram showing an embodiment of the present invention.

A path terminal controller 38 reflects the path over-head status monitored by the STS path terminal/monitor parts 36a and 36b on the path terminal point control data that are stored in a path terminal point control data memory 381, and provides the data in response to the path terminal point control retrieval requests from the network controller 1 (see FIG. 1).

A line terminal point control part 39 reflects the line over-head status monitored by the line terminals 33a and 33b on the line terminal control data, and provides the data in response to the line terminal point control data retrieval requests from the network controller 1.

In a case of such system using ADMs, in which a path 101 is set between the ADMs 3-1 and 3-3 as shown in FIG. 14, in the STS path switch 42 of the ADM 3-1 the path 101 is set in that the path terminal points IDo and IDi are connected to each other. At this time, data indicating that the terminal points IDo and IDi are in connection with each other, is stored as STS path setting data in the STS path setting data memory 371 of the STS path controller 37.

In such prior art SONET, a trouble which occurs in any of the paths set between adjacent ones of the DCSs 2-1 to 2-6, can be coped with an automatic network restoration (TRANS) function, which is previously assembled in each DCS, and pertaining techniques are disclosed in Japanese Laid-Open Patent Publication No. 60-22848 and Japanese Laid-Open Patent Publication No. 64-23647.

In such prior art techniques, only paths that are set between adjacent DCSs are capable of automatic restoring by the automatic communication network restoring function. In the actual SONET, as shown in FIG. 14, the communication network includes not only DCSs but also ADMs, and a path may be set between adjacent ADMs (such as one showing as working route 101). In the prior art system, therefore, when a transmission line trouble A (see FIG. 14) takes place in the path 101 set between adjacent ADMs, the path 101 can not be restored by the prior art process of automatic restoration of path between adjacent DCSs.

SUMMARY OF THE INVENTION

An object of the present invention is therefore to provide an automatic communication network restoring system which is capable of automatic relieving of a path set between adjacent ADMs in the event of a trouble in the path.

According to the present invention, there is provided a system for automatically restoring transmission line in trouble in a communication network comprising a synchronous optical transmission network, a plurality of nodes having a function of controlling the switching of a plurality of path terminating points for a synchronous transmission signal path add/drop function, and a network controller for controlling the whole communication network of the synchronous optical transmission network and nodes, the nodes each including: path terminating point control data memory means, in which are previously stored path terminating point identifying data identifying path terminating point corresponding to the own path terminating point and switching destination path terminating point identifying data identifying switching destination path terminating point of a spare route, over which a path including any of the corresponding path terminating points is to be switched in the event of occurrence of a trouble in the path; switching destination path terminating point judging means for judging, in response to the occurrence of the path trouble, switching destination path terminating point identifying data corresponding to the trouble path terminating point stored in the path terminating point control data memory means; and path switching control means for controlling the switching of the trouble path terminating point over to a switching destination path terminating point identified by the switching destination path terminating point identifying data provided as a result of judgment in the switching destination path terminating point judging means.

The switching destination path terminating point judging means includes means for inserting and extracting trouble detection data for detecting a transmission line trouble in and out of an over-head of signal transmitted through the path, means for checking whether the extracted trouble detection data is different from an expected value, and means for determining, when it is detected that the data is different from the expected value, that a transmission line trouble is present, thereby judging the switching destination path terminating point identifying data to identify a trouble path terminating point. The path switching control means includes opposite side path terminating point data memory means, in which opposite side path terminating point data indicative of opposite side path terminating points each corresponding to each of the own path terminating points are stored, and control means for controlling path terminating point switching according to the trouble path terminating point identifying data and switching destination path terminating point identifying data reported from the switching destination path terminating point judging means and also the switching destination path terminating point identifying data stored in the opposite side path terminating point memory means.

According to another aspect of the present invention, there is provided a system for automatically restoring transmission line in trouble in a communication network comprising a synchronous optical transmission network, a plurality of nodes having a function of controlling the switching of a plurality of path terminating points for a synchronous transmission signal path add/drop function, and a network controller for controlling the whole communication network of the synchronous optical transmission network and nodes, the nodes each including: path setting data memory means, in which are previously accommodated data sets each constituted by path terminating point identifying data identifying a path terminating point corresponding to each of the own path terminating points and opposite side path terminating point identifying data to which an opposite side path terminating point is to be connected; path terminating point control data memory means, in which are previously stored terminating point identifying data identifying path terminating points corresponding to the own path terminating points, switching destination path terminating point identifying data identifying switching destination path terminating point of a spare route, over which a path including any of the corresponding path terminating points is to be switched in the event of occurrence of a trouble in the path, and switching state data indicative of the state of switching of the corresponding path terminating point over to the spare route; switching destination path terminating point judging means for judging, in response to the occurrence of the path trouble, switching destination path terminating point identifying data corresponding to the trouble path terminating point stored in the path terminating point control data memory means; path switching control means for controlling the switching of the trouble path terminating point over to a switching destination path terminating point identified by the switching destination path terminating point identifying data provided as a result of judgment in the switching destination path terminating point judging means and also controlling the re-writing of opposite side path terminating point identifying data in the path setting data memory means after the path switching; path switching-back control means for controlling, in response to the restoration of the trouble path, the switching of the path terminating point connection state back to the state before the path switching by the path switching control means with reference to re-written data in the path setting data memory means. The switching destination path terminating point judging means includes means for judging, in response to the restoration of the trouble path, switching destination path terminating point identifying data identifying the pertinent path terminating point stored in the path terminating point control data memory means; and the path switching-back control means executes switching-back control by using the result of judgment of the switching destination path terminating point judging means after the restoration of the trouble path and with reference to the data in the path setting data memory means. The switching destination path terminating point judging means includes means for inserting and extracting trouble detection data for detecting a transmission line trouble in and out of an over-head of signal transmitted through the path, means for checking whether the extracted trouble detection data is different from an expected value, means for determining, when it is detected that the data is different from the expected values, that a transmission line trouble is present, thereby judging the switching destination path terminating point identifying data to identify a trouble path terminating point, and means for determining, when it is detected that the data is identical with the expected value, that a transmission line trouble has been restored, thereby judging the switching destination path terminating point identifying data to identify a restored path terminating point.

According to other aspect of the present invention, there is provided an automatic transmission line restoring method comprising steps of: previously determining a spare path corresponding to a working path set between ADMs (Add-Drop Multiplexers); storing spare path terminating point data together with working path terminating point data; retrieving, when detecting generation of a transmission line trouble in a working path, spare path terminating point data with reference to path terminating point control data; providing the spare path terminating point data together with working path terminating point data; and instructing to switch the working path terminating point from the prevailing path terminating point over to the spare path terminating point.

Other objects and features will clarified from the following description with reference to attached drawings.

DETAILED DESCRIPTION OF THE PREFERRED EMBODIMENTS

In each of a plurality of ADM nodes for STS path add/drop (insertion/extraction) in SONET, a spare route is set in correspondence to a working route, to which a path terminating point of each ADM node belongs, and data of a switching destination path terminating point corresponding to the spare route is previously stored as path terminating point control data. In the event of a path trouble, a switching destination terminating point corresponding to the path terminating point control data is found, and the path terminating point corresponding to the trouble path is switched form the prevailing path terminating point over to the switching destination path terminating point. In response to restoration of the trouble path, control of switching-back to the original path terminating point is made. In this way, the transmission line in trouble can be automatically restored.

FIG. 1 is a block diagram showing an embodiment of the present invention. In the Figure, parts like those in FIGS. 3–5, 13 and 14 are designated by like reference numerals and symbols. The illustrated communication network comprises a plurality of DCSs 2-1 to 2-6, ADMs 3-1 to 3-10 each inserted between adjacent ones of the DCSs, and a network controller 1 for system controlling the entire SONET network comprising the DCSs and ADMs.

FIG. 2 is a block diagram showing a specific example of each of the ADMs 3-1 to 3-10 as nodes in FIG. 1. In the Figure, parts like those in FIG. 15 are designated by like reference numerals and symbols. Line check frame inserting/extracting parts 40a and 40b periodically detect and extract only F2 bytes in the path over-heads extracted in STS path terminal/monitor parts 36a and 36b, and deliver three bytes among the extracted F2 bytes as a line check frame to respective line checking parts 41a and 41b, while periodically inserting predetermined three bytes of line check frame in F2 bytes of path over-head in each byte unit.

Line check parts 41a and 41b check whether the received line check frame is identical with a normal frame pattern. If the line check frame is not identical, this state is informed inclusive of its path terminating point ID (identification data) to a path terminating point controller 38.

The path terminating point controller 38 is provided with a path terminating point control data memory 381 and a path switching/switching-back controller 382. The path switching/switching-back controller 382, in response to receipt of line check frame abnormality from the line checking parts 41a and 41b, retrieves and determines the switching destination path terminating point ID of the terminating point IDs of the abnormal path from the path terminating point control data memory 381, and provides a control command for switching the path in trouble by reporting this switching destination path terminating point ID together with the pertinent path terminating point ID to a path setting part 372 in an STS path controller 37. Also, is response to receipt of a notice of line check frame normality from the line checking parts 41a and 41b, the path switching/switching-back controller 38 retrieves the switching designation path terminating point ID set as normal path terminating point control data from the path terminating point control data memory 382, and provides a path switching-back control command together with the pertinent path terminating point ID to the path setting part 372.

The path setting controller 372, in response to receipt of this path switching control command, executes switching control of the trouble path terminating point from the prevailing path terminating point over to the switching destination path terminating point or switching-back control from the switching destination path terminating point over to the prevailing path terminating point according to the command data, i.e., prevailing path terminating point ID and switching destination path terminating point ID, and also switching destination path terminating point (i.e., prevailing opposite side path terminating point) ID previously stored in the STS path setting data memory 371. The remainder of the structure is the same as in the example shown in FIG. 15.

Figure 3:
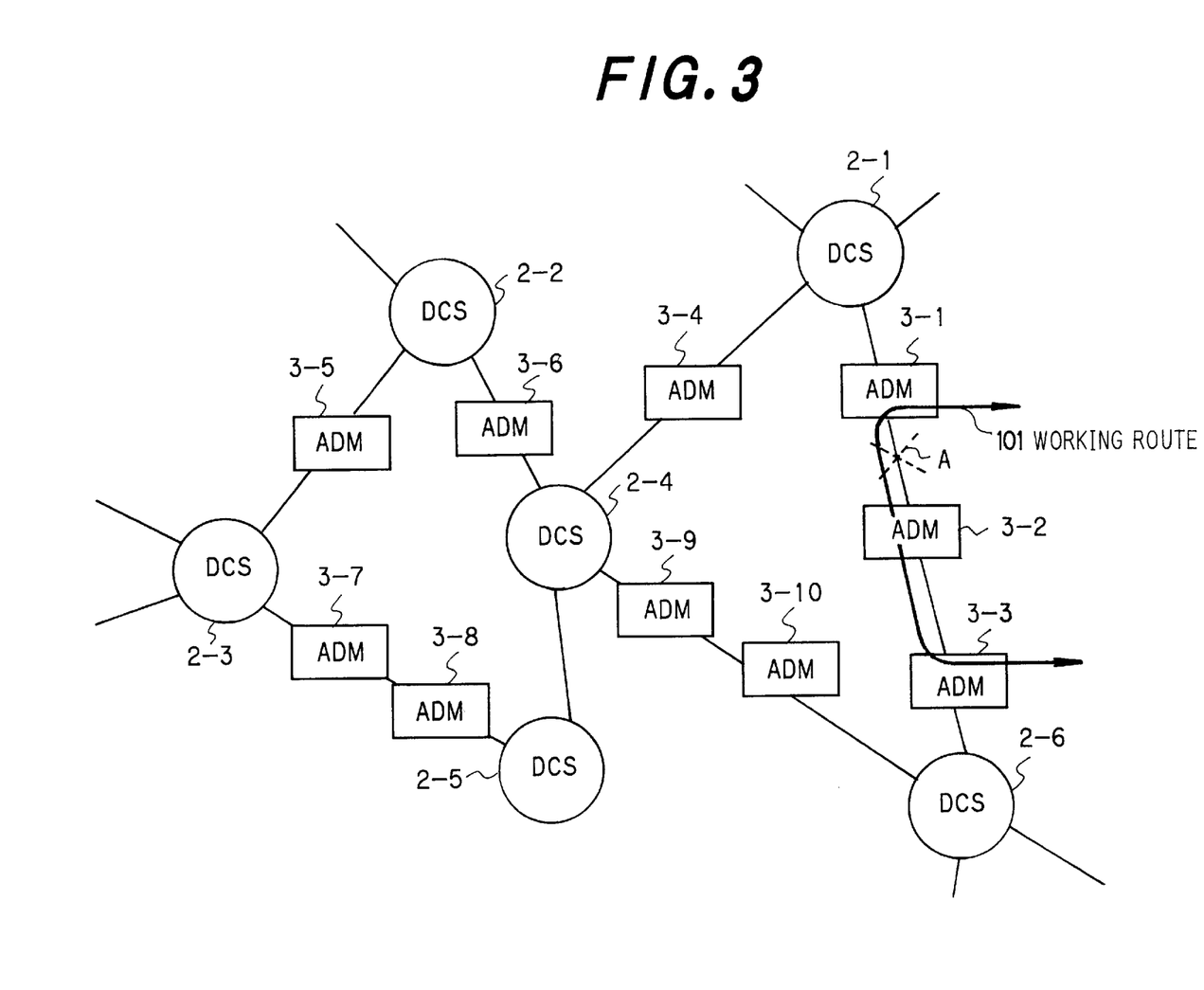
FIG. 3 is an example of path constituted by ADM in SONET.
Figure 4:
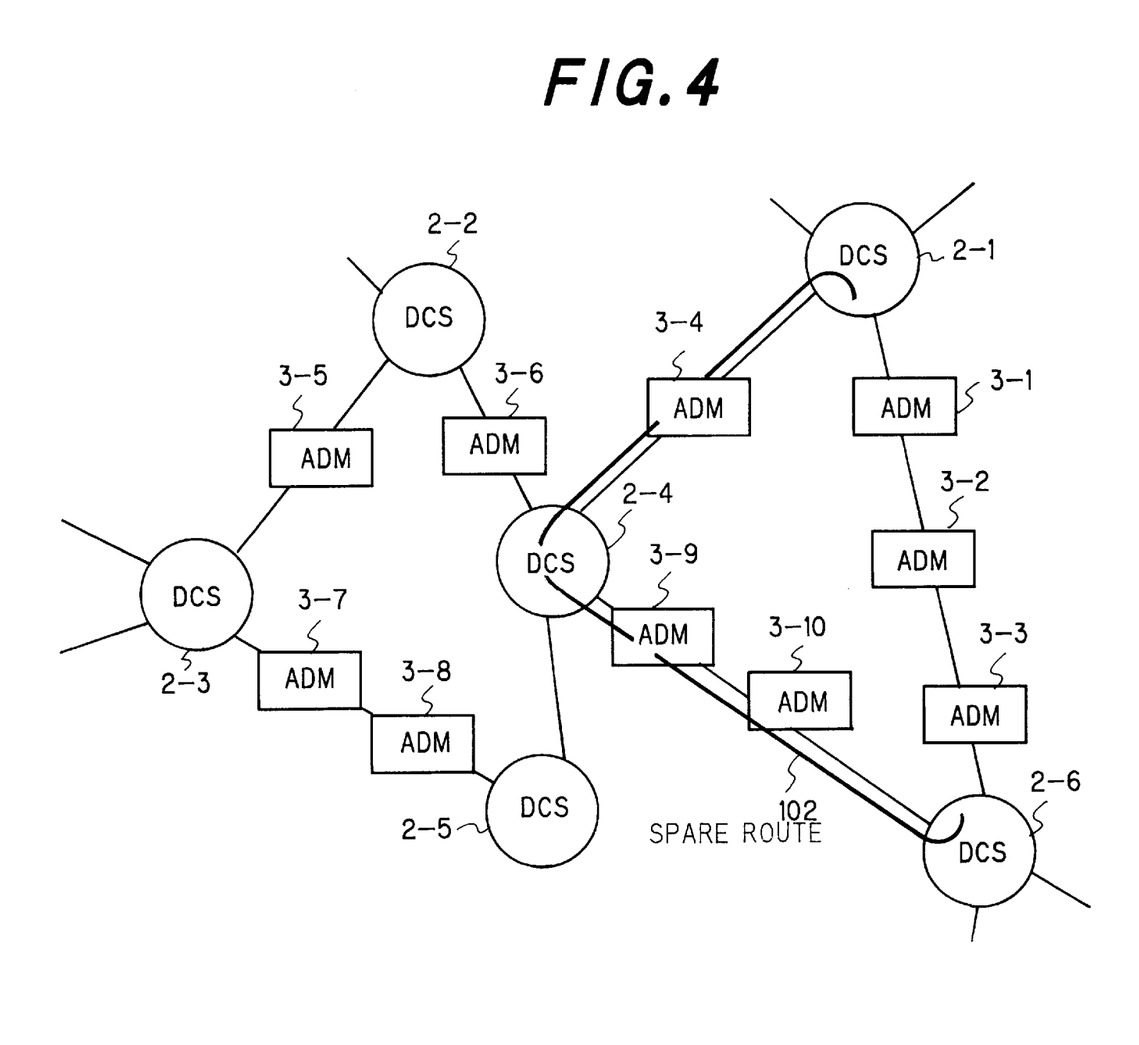
FIG. 4 is an example of a spare route for the working path as bypassing route.

Assuming now a working route of a path set between adjacent ADMs is as shown at 101 in FIG. 3, when a trouble occurs in a spot A of the transmission line of the route 101, the path of this route 101 has to be relieved. For the purpose of the relief, a spare route 102 as shown in FIG. 4 is preliminarily set in as a bypassing route.

Figure 5:
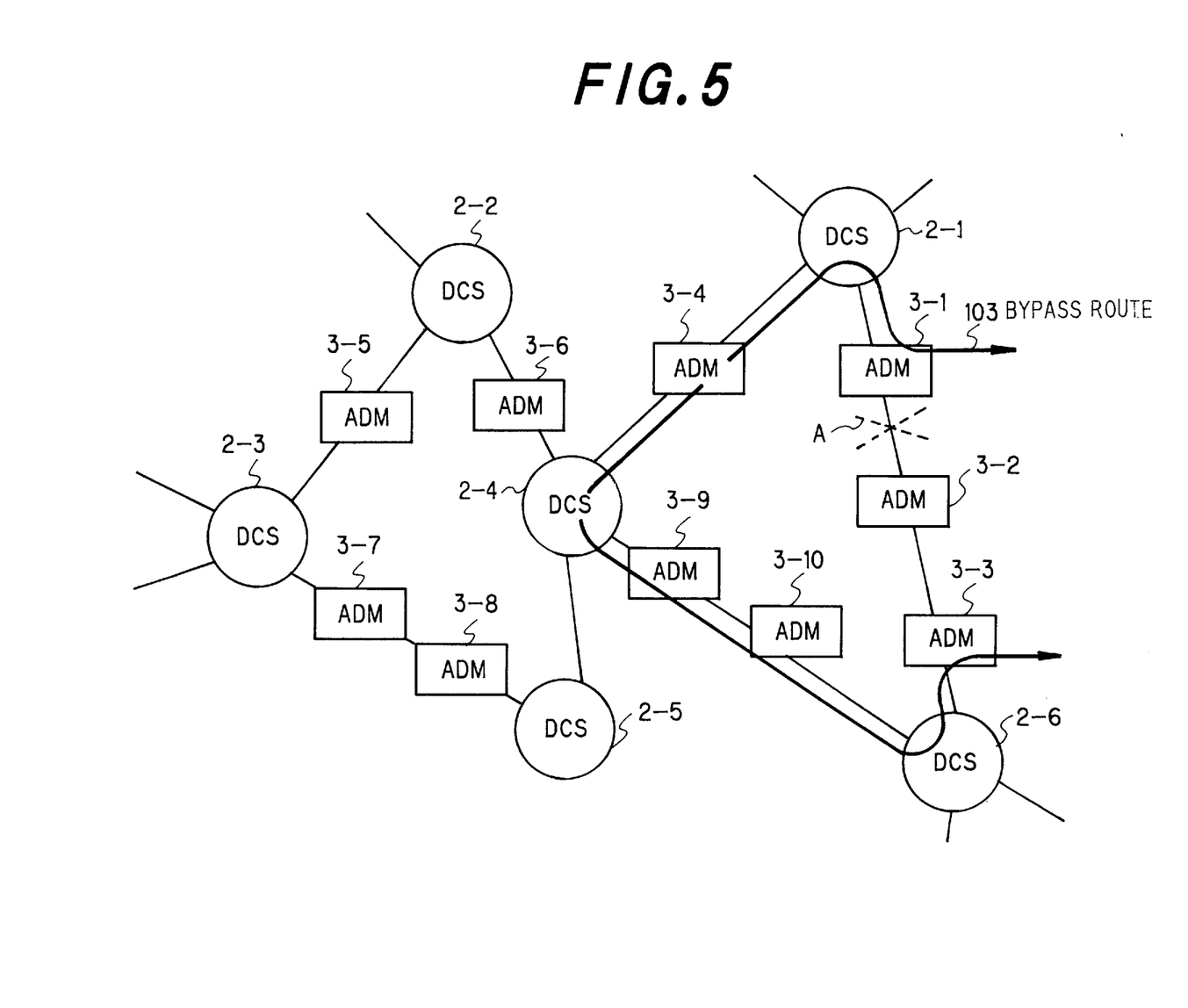
FIG. 5 is an example of the bypassing route set by the spare route for the transmission line in trouble in the working path.

When the trouble A occurs in the path 101 set between ADMs as shown in FIG. 3, the path 101 is automatically switched over to the spare route 102, thus forming a bypassing route 103 as shown in FIG. 5. To this end, automatic path terminating point switching control is necessary in ADMs 3-1 to 3-3 as nodes on the opposite sides of the spot of trouble A.

Figure 6:
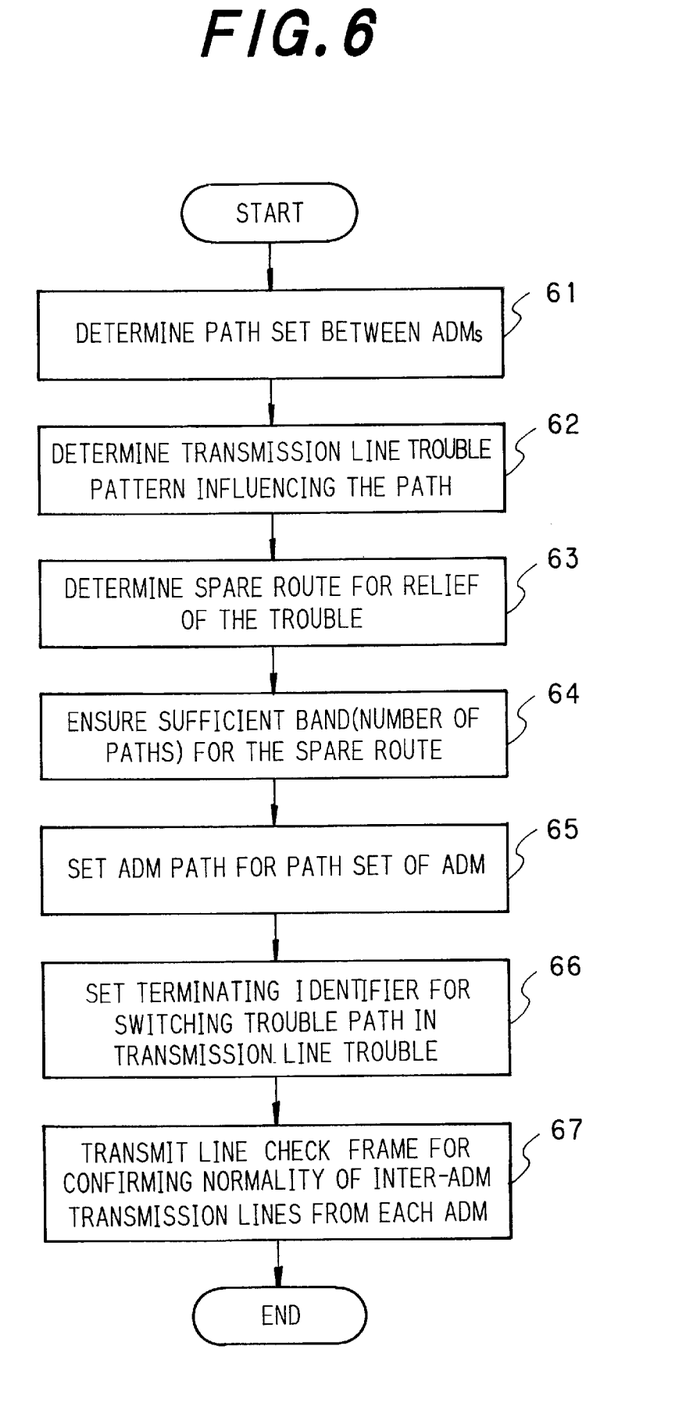
FIGS. 6 to 8 are flow charts for explaining the operation of the embodiment of the present invention.

A process of preparation such as the setting of the spare route 102 for the prevailing the working route 101 and the setting of various data for the switching of route over to the spare route 102, will now be described with reference to the flow chart of FIG. 6.

First, the controlling personnel controlling the communication network shown in FIG. 1 predicts the number of paths, route, etc. predicted to be set between ADMs and designs a communication network which can ensure the band (i.e., number) of spare routes capable of bypassing paths (steps 61 to 64).

Figure 9:
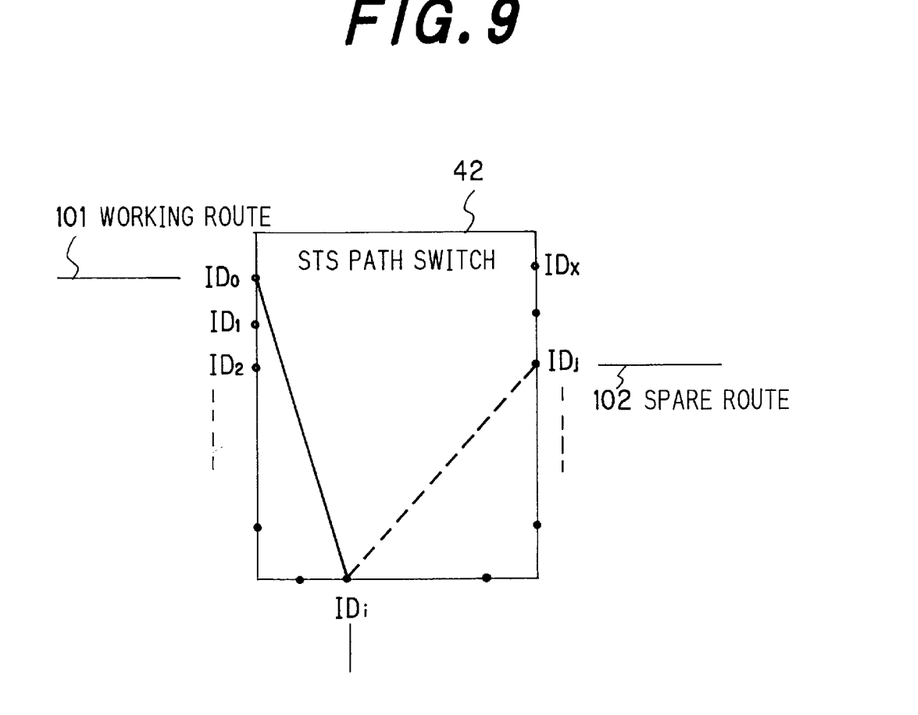
FIG. 9 is an example of STS path switch 42 of ADM in FIG. 2.
Figure 10:
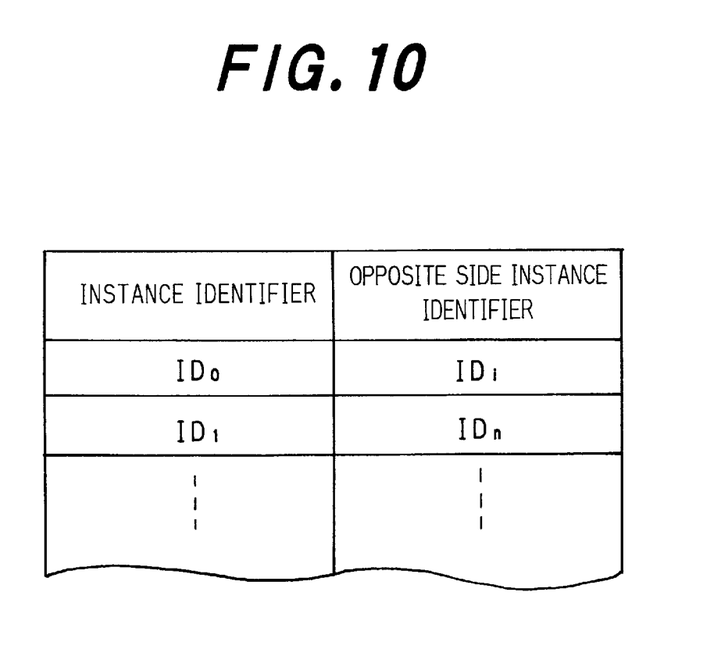
FIG. 10 is an example of data stored in STS path set data memory 371 in FIG. 2.

Then, the user executes path setting between ADMs according to the necessary traffic. The path setting is made by path setting control from the network control personnel 1 with respect to all the ADMs present on the route. The path setting (i.e., switch setting in the STS path switch 42) is executed with notification of a combination of path terminating point IDs of the input and output of the STS path switch 42 to the STS path controller 37. The combination data is stored in the STS path setting data memory 371. Assuming that, for instance, the working route 101 shown in FIG. 3 is set through connection of the path terminating points IDo and IDi in the STS path switch 42 in the ADM 3-1 as shown in FIG. 9, a path terminating point connection relation as shown in FIG. 10 is stored in the STS path setting data memory 371 using instance identifiers, i.e., IDs.

Then, the spare route 102 is set with respect to the working route 101 (step 66). Assuming that the spare route 102 is set through the switching of the path terminating point IDi from the working path terminating point IDo over to IDj, as shown in FIG. 9, in the path switch 42 of the ADM 3-1, data as shown in FIG. 11 are stored in the path terminating point control memory 381 of the path terminating point controller 38.

Figure 11:
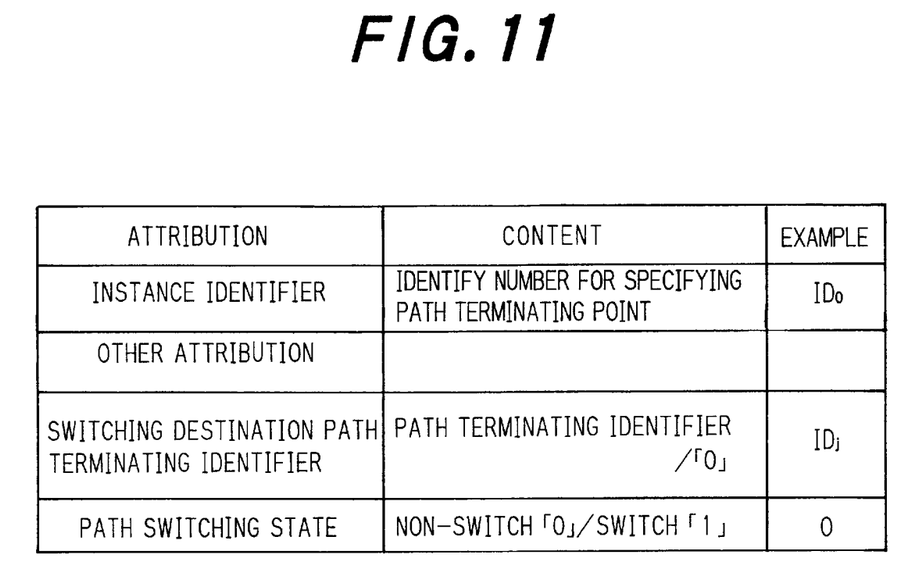
FIG. 11 is an example of data stored in STS path terminating point control memory 381 in FIG. 2.

Referring to the table shown in FIG. 11, for the path terminating point with instance identifier IDo, it is previously set that the switching destination path terminating point identifier is IDj. In the case of path terminating point which require no connection change for the spare route switching, "0" is set as the switching path terminating point identifier.

After the above process, operation for actual communication is made. In the operation, it becomes necessary for each ADM to detect the transmission line trouble occurrence. In this embodiment, each ADM transmits the line check frames for confirming the normality of inter-ADM transmission lines (step 67).

Figure 12:
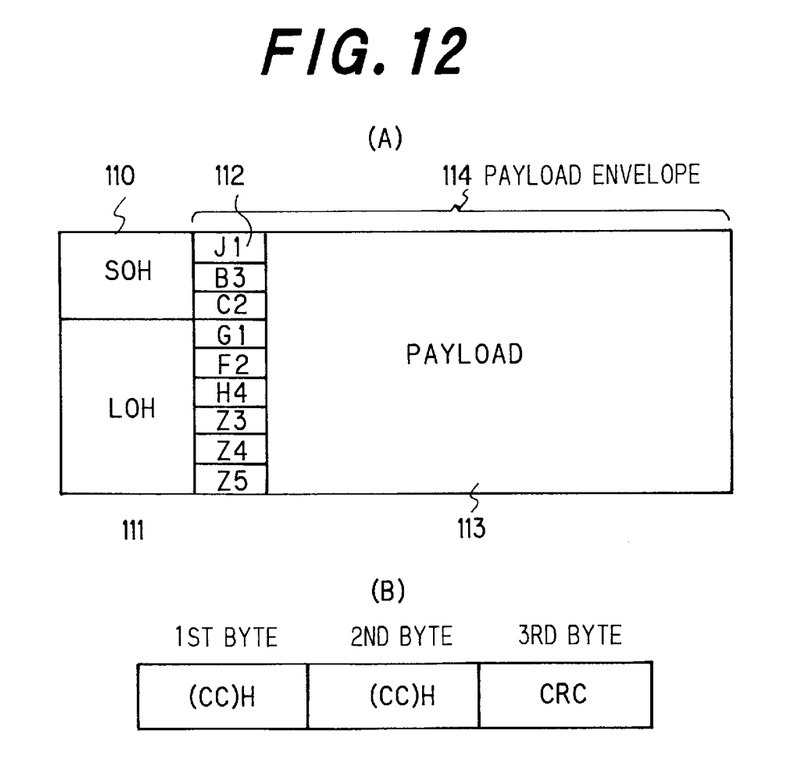
FIG. 12 is a drawing for explaining the line check frame.
Figure 13:
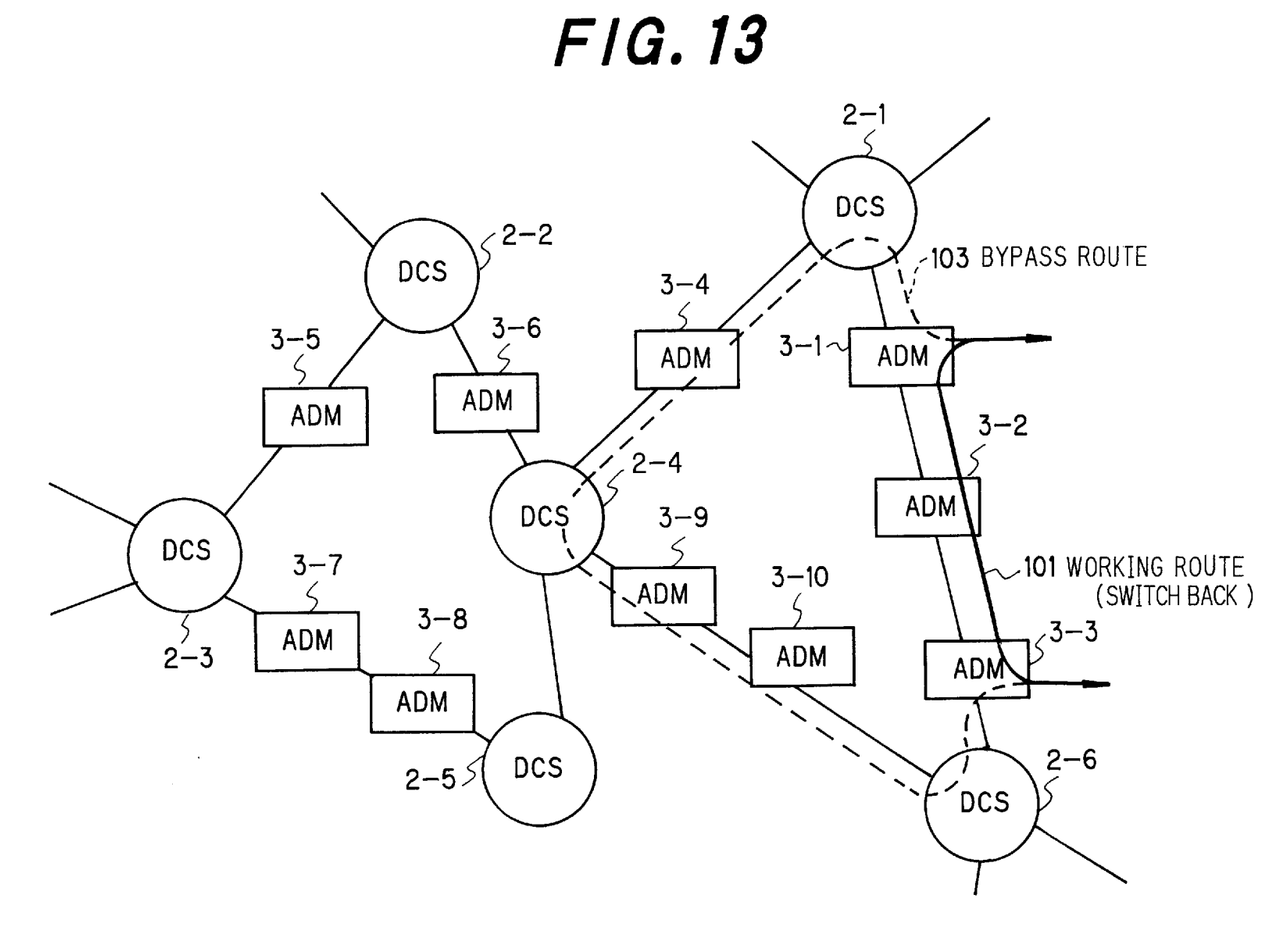
FIG. 13 is a state of the switch-back after restoring the trouble.

The sending and extracting detection of the line check frames are executed by line check frame inserting/extracting parts 40a and 40b. FIG. 12(A) shows an example of line check frame. This example uses F2 byte in payload envelope over-head. Three successive bytes as the F2 bytes, as shown in FIG. 12(B), are used as line check frame.

The first and second bytes constitute a predetermined check code, and the third byte constitutes a CRC code of the two bytes. In FIG. 12(A), reference numeral 110 designates a section over-head (SOH), 111 a line over-head (LOH), 113 a payload, and 114 a payload envelope.

Figure 7:
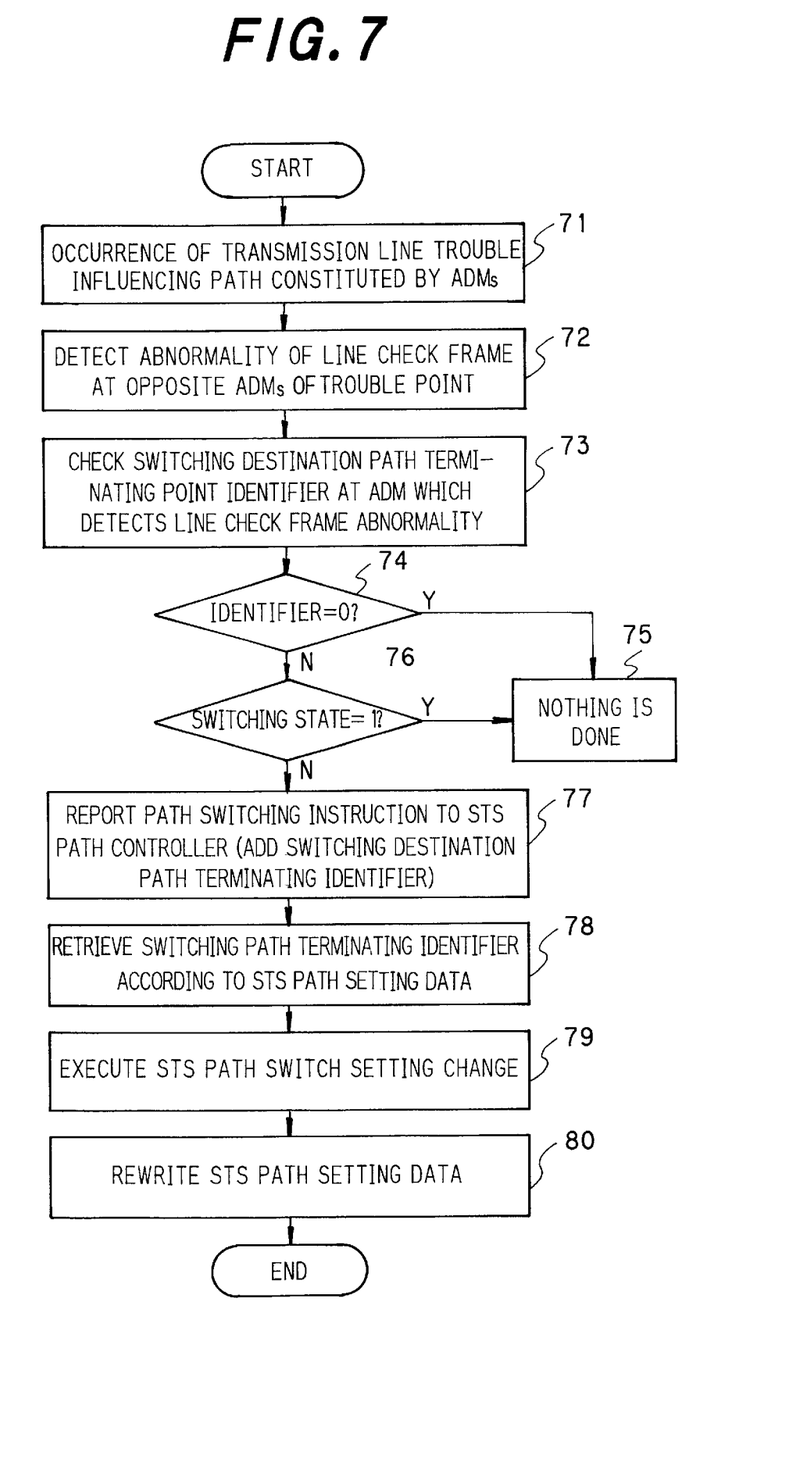

Under the above assumption, the operation of the embodiment of the present invention will now be described with reference to the flow chart of FIG. 7. Upon occurrence of transmission line trouble A as shown in FIG. 3, influencing a path constituted by sole ADMs (step 71), a line check frame to be received vanishes at the transmission line trouble A, so that a line check frame which is not expected is detected by the line checking parts 41a and 41b in the opposite side ADMs 3-1 and 3-2.

This line check frame is transmitted up to the ADM, in which the path set between ADMs is detected. Thus, all the ADMs on the path that is set detect the line check frame abnormality. Each ADM reports the abnormality to the path terminating point controller 38 via its line checking part.

The path terminating point controller 38 checks whether the path terminating point ID corresponding to the received line check abnormality identifies a path terminating point having to do with the path setting. This check is executed according to the data shown in FIG. 11 stored in the path terminating point control data memory 381. In other words, the controller 38 checks whether the switching destination path terminating point identifier with respect to the path terminating point ID (i.e., instance identifier and IDo in this embodiment) corresponding to the path abnormality is "0" (steps 73 and 74).

If the identifier is "0", no path switching is necessary, and nothing is done (step 75). In this embodiment, the switching destination path terminating point identifier is "IDj", and subsequently the state of path switching is checked (step 76). The prevailing state is "non-switched state" or "0". Thus, the path switching/switching-back controller 382 determines that the path switching is necessary, and sends out a path switching control command to the STS path controller 37.

At this time, the switching destination path terminating point ID (IDj) indicative of the switching destination is reported together with the path terminating point ID (IDo) corresponding to the path abnormality to the STS path controller 37 (step 77). The STS path controller 37 retrieves the data (FIG. 10) in the STS path setting data memory 371 with reference to the reported path terminating point ID (IDo) corresponding to the path abnormality (step 78), and determines that the prevailing opposite side instance path terminating point ID corresponding to IDo is IDj.

Thus, the path switching part 372 switches the path terminating point IDi in the STS path switch 42 from IDo over to IDj (step 79). At this time, the data stored in the STS setting data memory 371 is re-written or switched from one representing the connection state (IDo–IDi) shown in FIG. 9 over to one representing a new connection state (IDi–IDj) (step 80).

Figure 8:
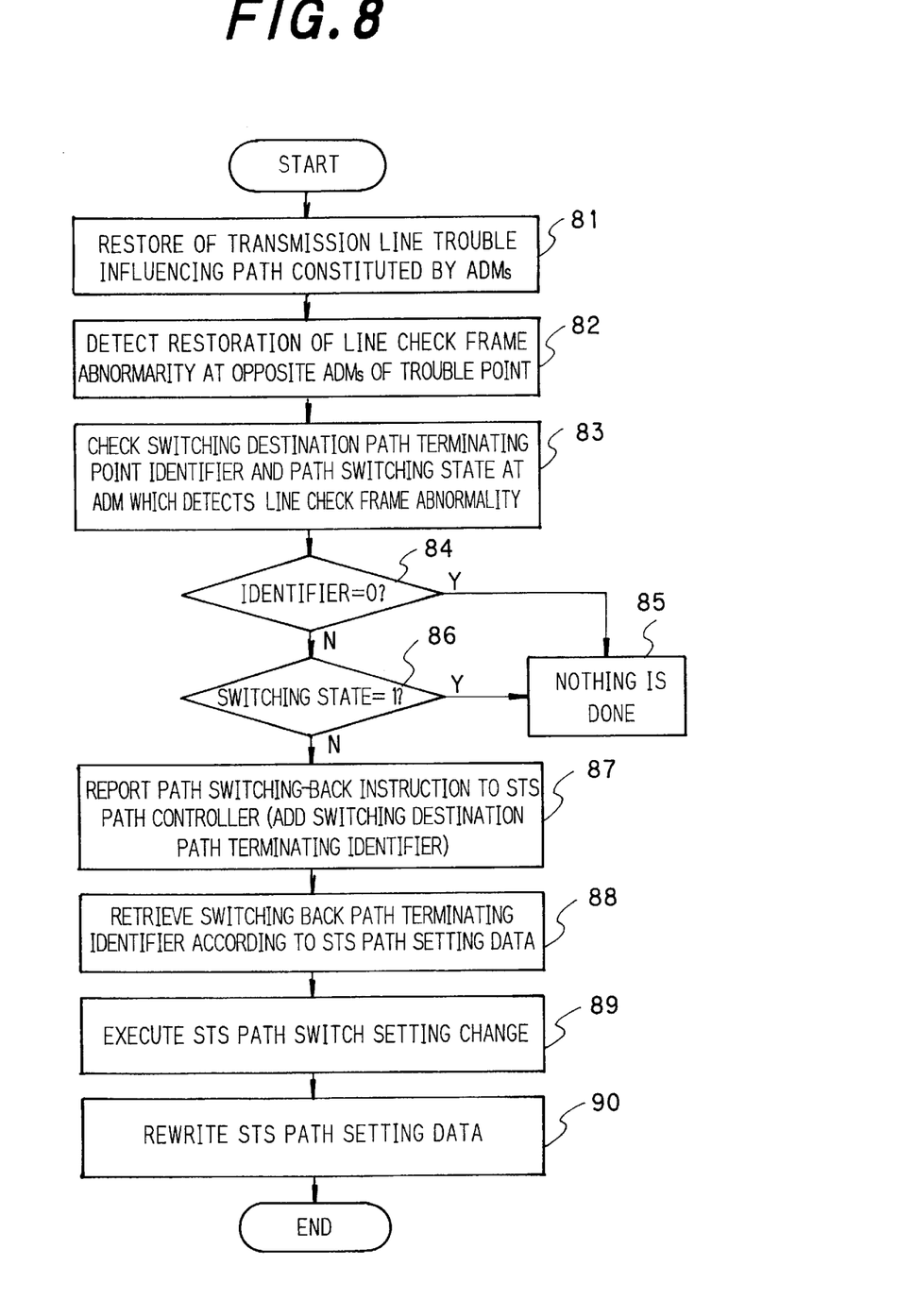

Now, the switching-back process will be described with reference to the flow chart of FIG. 8. When the transmission line trouble A influencing the path constituted by the sole ADMs as shown in FIG. 3 is removed (step 81), an expected line check frame is detected by the transmission line checking parts 41a and 41b of the opposite side ADMs 3-1 and 3-2. This line check frame is transmitted up to the ADM, which the path set between ADMs is terminated in, so that all the ADMs on the path that is set detect the line check frame abnormality restoration. Each ADM reports the abnormality restoration to the path terminating point controller 38 while holding the normal state in its line checking parts 41a and 41b.

The path terminating point controller 38 checks whether the path terminating point ID pertaining to the received line check frame abnormality restoration identifies a terminating point having to do with the path setting, i.e., a path setting subject path terminating point. This check is done with reference to the data shown in FIG. 11, stored in the path terminating point data memory 381. That is, the controller 38 checks whether the path terminating point ID (i.e., instance identifier and IDo in this embodiment) pertaining to the path abnormality restoration is "0" (step 84).

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A system for automatically restoring a transmission line in trouble in a working path of a communication network comprising a synchronous optical transmission network, a plurality of nodes having a function of controlling the switching of a plurality of path terminating points for a synchronous transmission signal path add/drop function, and a network controller for controlling the whole communication network of the synchronous optical transmission network and nodes, the nodes each including:
   path terminating point control data memory means, in which are previously stored path terminating point identifying data identifying path terminating point for a working path terminating point, and switching destination path terminating point identifying data identifying switching destination path terminating point of a spare route, over which a path including any of the corresponding path terminating points is to be switched in the event of occurrence of a trouble in the working path;
   switching destination path terminating point judging means for judging, in response to the occurrence of trouble in the working path, switching destination path terminating point identifying data corresponding to the troubled working path terminating point stored in the path terminating point control data memory means, wherein said switching destination path terminating point judging means includes means for inserting and extracting trouble detection data for detecting a transmission line trouble in and out of an over-head of signal transmitted through the path, means for checking whether the extracted trouble detection data is different from an expected value, and means for determining, when it is detected that the data is different from the expected value, that a transmission line trouble is present, thereby judging the switching destination path terminating point identifying data to identify a trouble path terminating point; and path switching control means for controlling the switching of the troubled working path terminating point over to a switching destination path terminating point identified by the switching destination path terminating point identifying data provided as result of judgment in the switching destination path terminating point judging means.

2. The automatic transmission line restoring system according to claim 1, wherein the path switching control means includes opposite side path terminating point data memory means, in which opposite side path terminating point data indicative of opposite side path terminating points each corresponding to each of the working path terminating points are stored, and control means for controlling path terminating point switching according to the trouble path terminating point identifying data and switching destination path terminating point identifying data reported from the switching destination path terminating point judging means and also the switching destination path terminating point identifying data stored in the opposite side path terminating point memory means.

3. A system for automatically restoring a transmission line in trouble in a working path of a communication network comprising a synchronous optical transmission network, a plurality of nodes having a function of controlling the switching of a plurality of path terminating points for a synchronous transmission signal path add/drop function, and a network controller for controlling the whole communication network of the synchronous optical transmission network and nodes, the nodes each including:

path setting data memory means, in which are previously accommodated data sets each constituted by path terminating point identifying data identifying a path terminating point corresponding to each of the working path terminating points and opposite side path terminating point identifying data to which an opposite side path terminating point is to be connected;

path terminating point control data memory means, in which are previously stored terminating point identifying data identifying path terminating points corresponding to the working path terminating points, switching destination path terminating point identifying data identifying switching destination path terminating point of a spare route, over which a path including any of the corresponding path terminating points is to be switched in the event of occurrence of a trouble in the working path, and switching state data indicative of the state of switching of the corresponding working path terminating point over to the spare route;

switching destination path terminating point judging means for judging, in response to the occurrence of trouble in the working path, switching destination path terminating point identifying data corresponding to the troubled working path terminating point stored in the path terminating point control data memory means, wherein said switching destination path terminating point judging means includes means for inserting and extracting trouble detection data for detecting a transmission line trouble in and out of an over-head of signal transmitted through the path, means for checking whether the extracted trouble detection data is different from an expected value, and means for determining, when it is detected that the data is different from the expected value, that a transmission line trouble is present, thereby judging the switching destination path terminating point identifying data to identify a troubled working path terminating point;

path switching control means for controlling the switching of the troubled working path terminating point over to a switching destination path terminating point identified by the switching destination path terminating point identifying data provided as a result of judgment in the switching destination path terminating point judging means and also controlling the re-writing of opposite side path terminating point identifying data in the path setting data memory means after the path switching; and path switching-back control means for controlling, in response to the restoration of the troubled working path, the switching of the path terminating point connection state back to the state before the path switching by the path switching control means with reference to re-written data in the path setting data memory means.

4. The automatic transmission line restoring system according to claim 1, wherein:

the switching destination path terminating point judging means includes means for judging, in response to the restoration of the troubled working path, switching destination path terminating point identifying data identifying the pertinent path terminating point stored in the path terminating point control data memory means; and the path switching-back control means executes switching-back control by using the result of judgment of the switching destination path terminating point judging means after the restoration of the troubled working path and with reference to the data in the path setting data memory means.

5. The automatic transmission line restoring system according to claim 4, wherein the switching destination path terminating point judging means includes means for inserting and extracting trouble detection data for detecting a transmission line trouble in and out of an over-head of signal transmitted through the path, means for checking whether the extracted trouble detection data is different from an expected value, means for determining, when it is detected that the data is different from the expected values, that a transmission line trouble is present, thereby judging the switching destination path terminating point identifying data to identify a troubled working path terminating point, and means for determining, when it is detected that the data is identical with the expected value, that a transmission line has been restored, thereby judging the switching destination path terminating point identifying data to identify a restored path terminating point.

6. A system for automatically restoring a transmission line in trouble in a working path of a communication network comprising a synchronous optical transmission network, a plurality of nodes having a function of controlling the switching of a plurality of path terminating points for a synchronous transmission signal path add/drop function, and a network controller for controlling the whole communication network of the synchronous optical transmission network and nodes, the nodes each including:

path terminating point control data memory means, in which are previously stored path terminating point identifying data identifying path terminating point for a working path terminating point, and switching destination path terminating point identifying data identifying switching destination path terminating point of a spare route, over which a path including any of the corresponding path terminating points is to be switched in the event of occurrence of a trouble in the working path;

switching destination path terminating point judging means for judging, in response to the occurrence of trouble in the working path, switching destination path terminating point identifying data corresponding to the troubled working path terminating point stored in the path terminating point control data memory means;

an instance identifier path switch state which indicates whether a path is to be preserved for path switching in the event of trouble in the working path, and wherein each of the paths present in a single optical fiber link can be independently set as a working path or as a stand-by path in order to secure specific bandwidth for path switching;

path switching control means for controlling the switching of the troubled working path terminating point over to a switching destination path terminating point identified by the switching destination path terminating point identifying data provided as result of judgment in the switching destination path terminating point judging means.

7. A system for automatically restoring a transmission line in trouble in a working path of a communication network comprising a synchronous optical transmission network, a plurality of nodes having a function of controlling the switching of a plurality of path terminating points for a synchronous transmission signal path add/drop function, and a network controller for controlling the whole communication network of the synchronous optical transmission network and nodes, the nodes each including:

path setting data memory means, in which are previously accommodated data sets each constituted by path terminating point identifying data identifying a path terminating point corresponding to each of the working path terminating points and opposite side path terminating point identifying data to which an opposite side path terminating point is to be connected;

path terminating point control data memory means, in which are previously stored terminating point identifying data identifying path terminating points corresponding to the working path terminating points, switching destination path terminating point identifying data identifying switching destination path terminating point of a spare route, over which a path including any of the corresponding path terminating points is to be switched in the event of occurrence of a trouble in the working path, and switching state data indicative of the state of switching of the corresponding working path terminating point over to the spare route;

switching destination path terminating point judging means for judging, in response to the occurrence of trouble in the working path, switching destination path terminating point identifying data corresponding to the troubled working path terminating point stored in the path terminating point control data memory means;

an instance identifier path switch state which indicates whether a path is to be preserved for path switching in the event of trouble in the working path, and wherein each of the paths present in a single optical fiber link can be independently set as a working path or as a stand-by path in order to secure specific bandwidth for path switching;

path switching control means for controlling the switching of the troubled working path terminating point over to a switching destination path terminating point identified by the switching destination path terminating point identifying data provided as a result of judgment in the switching destination path terminating point judging means and also controlling the re-writing of opposite side path terminating point identifying data in the path setting data memory means after the path switching; and path switching-back control means for controlling, in response to the restoration of the troubled working path, the switching of the path terminating point connection state back to the state before the path switching by the path switching control means with reference to re-written data in the path setting data memory means.

* * * * *